No. 621,471. Patented Mar. 21, 1899.
W. R. EDWARDS & S. F. BEEVOR.
SWITCH FOR ALTERING SPEED AND DIRECTION OF REVOLUTION OF ELECTRIC MOTORS, &c.
(Application filed Sept. 6, 1898.)
(No Model.) 2 Sheets—Sheet 1.
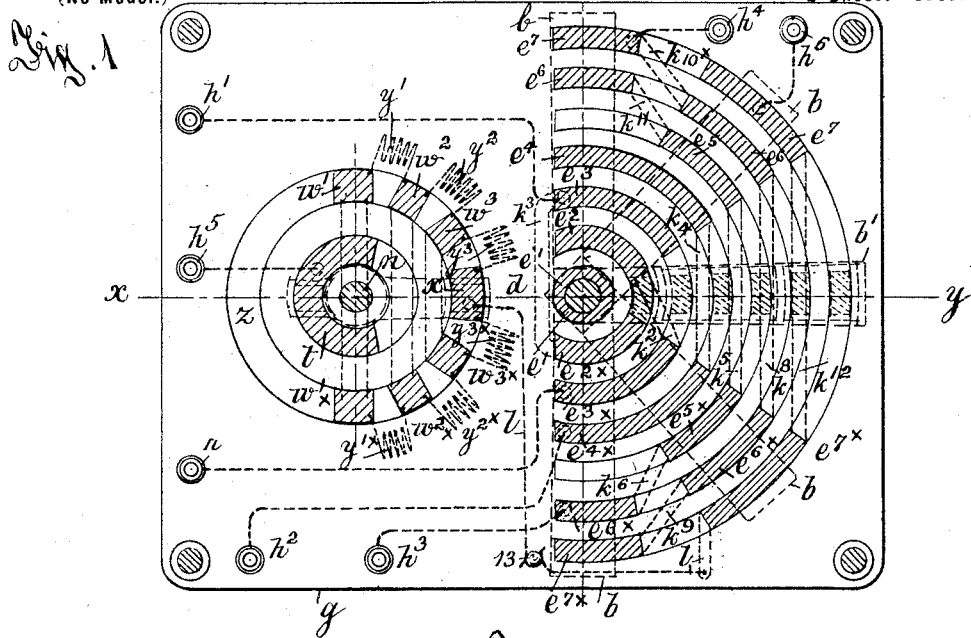
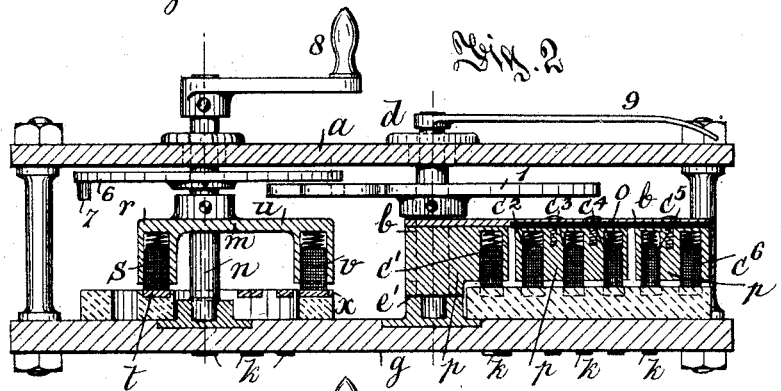
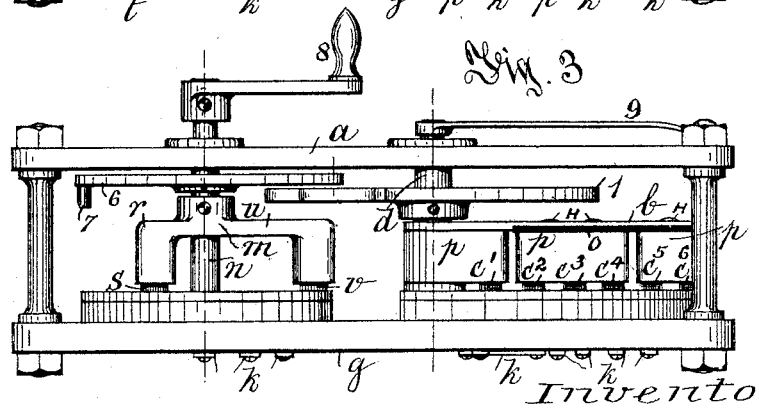
Witnesses:
E. B. Bolton
Inventors:
William Howland Edwards
Septimus Felix Beevor
By Richards
Their Attorneys No. 621,471. Patented Mar. 21, 1899.
W. R. EDWARDS & S. F. BEEVOR.
SWITCH FOR ALTERING SPEED AND DIRECTION OF REVOLUTION OF ELECTRIC MOTORS, &c.
(Application filed Sept. 6, 1898.)
(No Model.) 2 Sheets—Sheet 2.
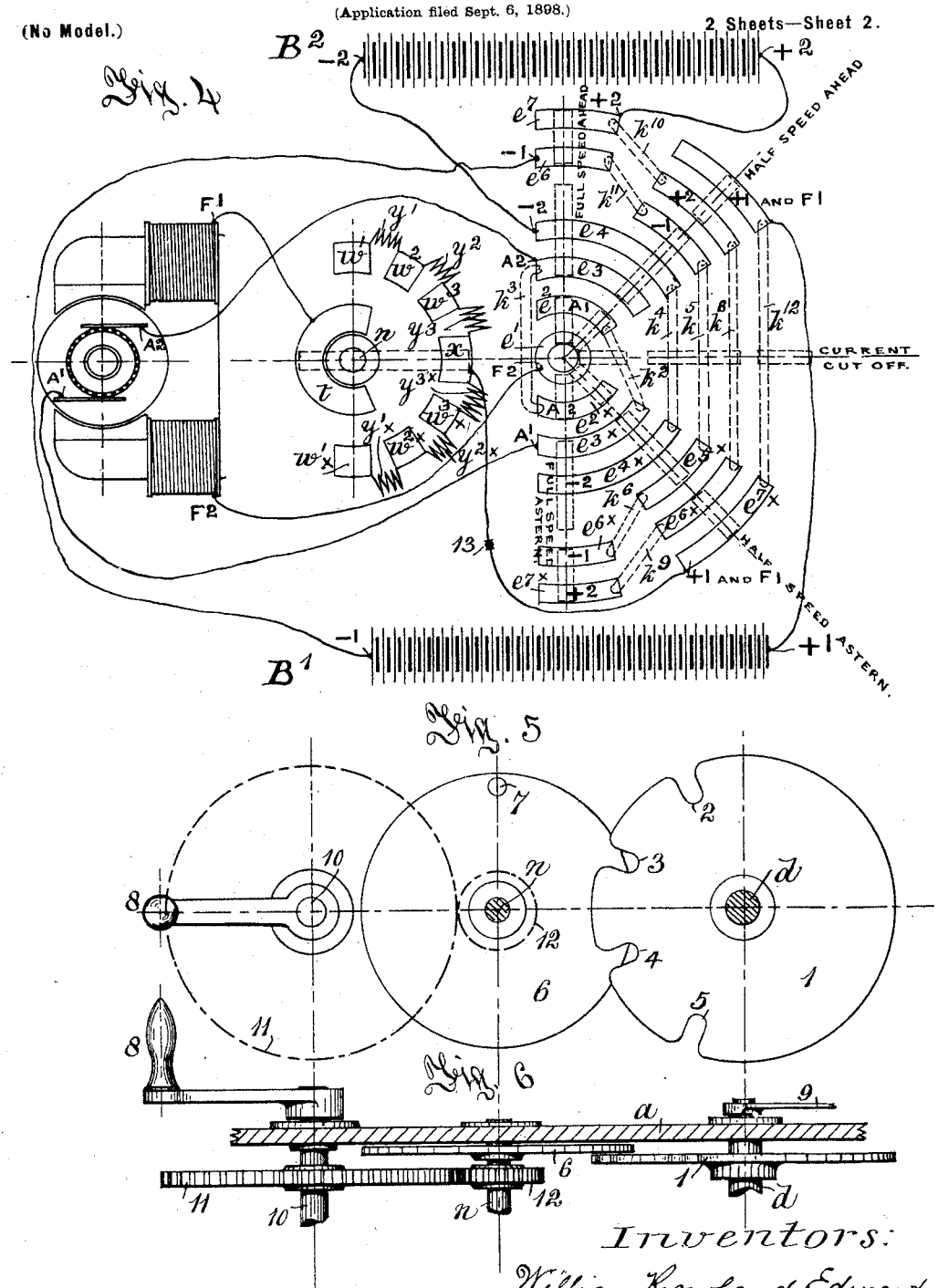

UNITED STATES PATENT OFFICE.

WILLIAM ROWLAND EDWARDS AND SEPTIMUS FELIX BEEVOR, OF LONDON, ENGLAND.

SWITCH FOR ALTERING SPEED AND DIRECTION OF REVOLUTION OF ELECTRIC MOTORS, &c.

SPECIFICATION forming part of Letters Patent No. 621,471, dated March 21, 1899.

Application filed September 6, 1898. Serial No. 690,328. (No model.)

*To all whom it may concern:*

Be it known that we, WILLIAM ROWLAND EDWARDS and SEPTIMUS FELIX BEEVOR, subjects of the Queen of Great Britain, residing at Weybridge, London, in the county of Surrey, England, have invented certain new and useful Improvements in Switches for Altering the Speed and Direction of Revolution of Electric Motors and for Altering the Course of the Electrical Current Around Field-Magnets; and we do hereby declare the following to be a full, clear, and exact description of the invention, such as will enable others skilled in the art to which it appertains to make and use the same.

Our invention relates to electric motors used for propelling boats or for other purposes in which the current is supplied from electric accumulators or other batteries and in which it is required to drive the motor at different speeds and in either direction—as, for instance, (in the case of a boat,) at full speed or half-speed ahead, or at full speed or half-speed astern, or to stop the motor altogether; and the objects of our improvements are, first, to attain the above requirements quickly and easily by the simple movement of a single handle, and, second, to reduce or prevent the injurious sparking of the parts by the contact of which the several changes are effected. We attain these objects in the manner and by the apparatus illustrated in the accompanying drawings, in which—

Figure 1 is a plan, partly in section, showing the several contact-pieces and connections. Fig. 2 is a transverse vertical section through the center of the apparatus. Fig. 3 is an end view. Fig. 4 is a diagrammatic plan illustrating the different contact-pieces, connections, electromotor, and batteries. Fig. 5 is a plan, and Fig. 6 a side view, shown partly broken off, of a modified method of operating the switch.

Similar letters and numerals refer to similar parts throughout the several figures.

In electromotors of the kind described the speed of the motor is altered, as required, by grouping the cells of the batteries in different ways. The direction of revolution of the motor is altered by reversing the electrical connection of the conducting-wire around either the armature or the field-magnet, but preferably the former.

Supposing, for example, that two speeds (half-speed and full speed) in both directions are required, the arrangement and connections may be as follows, as illustrated in diagram in Fig. 4: The battery is divided into two separate halves, which may be called $B'$ and $B^2$, the positive and negative terminals of $B'$ being called $+1$ and $-1$, respectively, and those of $B^2$ being called $+2$ and $-2$, respectively. The brushes connected with the armature of the motor M may be called $A'$ and $A^2$, respectively, the terminals of the coils surrounding the field-magnet N being called $F'$ and $F^2$, respectively.

For the different purposes required the various corresponding connections have to be made (by means of the switch) as follows:

For full speed ahead:
$$-1 \text{ to } +2$$
$$-2 \text{ to } A^2$$
$$A' \text{ to } F^2$$
$$F' \text{ to } +1,$$
(the two parts $B'$ and $B^2$ of the battery being therefore arranged in series.)

For half-speed ahead:
$$+1 \text{ and } F' \text{ to } +2$$
$$-2 \text{ and } -1 \text{ to } A^2$$
$$A' \text{ to } F^2,$$
(the two parts of the battery being in parallel.)

For full speed astern:
$$-1 \text{ to } +2$$
$$-2 \text{ to } A'$$
$$A^2 \text{ to } F^2$$
$$F' \text{ to } +1.$$

For half-speed astern:
$$+1 \text{ and } F' \text{ to } +2$$
$$-2 \text{ and } -1 \text{ to } A'$$
$$A^2 \text{ to } F^2.$$

The novel construction of the switch by which these different connections can be rapidly and easily made as required is as follows: Assuming that the switch board or case is viewed from above, as shown in Fig. 1, a center line $x\,y$, passing through the center of the switches, being parallel with the side nearest to the observer and the cover $a$ being removed, the center or spindle upon which is the switch-arm $b$ (which carries, by screws H, the brushes or equivalents $c\ c\ c$, by which the several contacts are made) is shown at $d$, somewhat nearer the right hand of the board than the center, and the several contact-pieces $e'\ e^2\ e'^{\times}\ e^{7\times}$, upon which the brushes $c$ upon the lower side of the switch-arm $b$ press, are arranged, with their connections, upon the lower board or base $g$ in the following manner:

The several contact-pieces $e'\ e^2\ e^7$ and $e'^{\times}\ e^{2\times}\ e^{7\times}$ are all curved concentric with the center $d$ of the switch-arm, but at different distances from the center, so as to form six semicircular paths, each of which is not continuous, but is formed as follows, (it being understood in this description that the curved contact-plates above the line $x\ y$ in the drawings are those used for the connections to drive the motor ahead and those below it are those used for driving it astern:)

The whole of the contact-pieces $e$ are divided into two groups, those above the center line $x\ y$ occupying about one-third of the semicircle through which the switch-arm $b$ travels, those below the line also occupying about one-third, and the central space between the two groups being left vacant, so that when the switch-arm is placed, as shown at $b'$ in Fig. 1, above this space, corresponding with the horizontal line $x\ y$, the motor is at rest. Taking the upper half first, the first contact-plate $e'$, adjoining or nearest the center upon which the switch-arm turns, is in electrical connection with $F^2$, (one terminal of the field-magnet coil, Fig. 4.) The next (second) curved concentric contact-piece $e^2$, at a sufficient radial distance from the central one, occupies about one-third of the semicircle and is in electrical connection through the conductor $k^2$ and the lower contact-piece $e^{3\times}$ with $A'$, one of the armature-brushes. (See Fig. 4.) The next (third) contact-piece $e^3$ also occupies the same angular space (one-third of the semicircle) and is in connection with the terminal $h'$, Fig. 1, and through it with $A^2$, the other armature-brush. (See Fig. 4.) The next (fourth) contact-piece $e^4$ occupies a similar angular space and is in connection directly or through the conductor $k^4$ with the $-2$ pole of the second half $B^2$ of the battery. (See Fig. 4.) The next (fifth) outer contact-piece $e^5$ has its end adjoining the central vacant part of the semicircle in the same radial line as the other contact-pieces; but its other end extends to only about one-third of the circumferential length of the others. The next (sixth) outer contact-piece $e^6$ has about one-third removed at the center, only its two ends remaining, and its higher end (or that nearest the top of the drawings) is in metallic connection through the conductor $k^{11}$ with the fifth or adjoining inner contact-piece $e^5$ last described, both being in connection through the conductors $k^5$ and $k^6$ and the terminal $h^3$ with the $-1$ pole of the first half $B'$ of the battery, Fig. 4. The outer (seventh) contact-piece $e^7$ also has about one-third removed at its center, and its inner or higher end is in connection through the conductor $k^{10}$ with the outer part of the sixth or adjoining inner contact-piece $e^6$ last described, both being in connection through the terminal $h^4$ with the $+2$ pole of the second half $B^2$ of the battery, Fig. 4, and, finally, the outer or right-hand part of the seventh or outer contact-piece $e^7$ is in connection through the terminal $h^6$ with the $+1$ pole of the first half $B'$ of the battery, Fig. 4. It will be understood that the concentric segments shown in Fig. 4 and the shaded segments in Fig. 1 represent the conducting contact-pieces over which the brushes of the switch pass to make contact, and the parts between them are of non-conducting material, over which the brushes $c$, Figs. 2 and 3, pass between the contact-pieces. The metallic connections between the different conducting-segments $e$ are shown in dotted lines $k$ in Figs. 1 and 4. They are arranged below the base $g$ of the instrument, as seen in Figs. 2 and 3.

The lower half of the semicircular set of contact-pieces, or that relating to the changes of current necessary for reversing the direction of revolution of the motor, is similar to the upper one as far as regards the angular length and position of the contact-pieces; but the connections are different, as follows: The second contact-piece $e^{2\times}$ is connected, through the conductor $k^3$, with the third $e^3$ on the upper half, and therefore, through the terminal $h'$, with the armature-brush $A^2$. The third contact-piece $e^{3\times}$ is connected, through the conductor $k^2$, with the second $e^2$ on the other side and through the terminal $h$ with the other armature-brush $A'$. The fourth $e^{4\times}$ is connected by the conductor $k^4$ with the fourth $e^4$ on the other side through the terminal $h^2$ and with the $-2$ pole of the $B^2$ half of the battery, Fig. 4. The fifth contact-piece $e^{5\times}$ is connected, by the conductor $k^5$, with the fifth $e^5$ on the other side and also, through the conductor $k^6$, with the inner end of the sixth $e^{6\times}$ and, through the terminal $h^3$, with the $-1$ pole of the $B'$ half of the battery. The outer or right-hand end of the sixth contact-piece $e^{6\times}$ is connected, through the conductor $k^8$, with the corresponding outer end of the sixth $e^6$ on the other side and also, through the conductor $k^9$, with the inner end of the outermost (or seventh) contact-piece $e^{7\times}$, while both are connected, through the conductor $k^{10}$ and the terminal $h^4$, with the $+2$ pole of the $B^2$ half of the battery. Finally, the outer end of the seventh contact-piece $e^{7\times}$ is connected, through the conductor $k^{12}$, with the outer end of the corresponding seventh contact-piece $e^7$ on the other side and also, through the conducting-wire 1, (in the manner hereinafter described,) with the terminal $h^5$ to the $F'$ terminal of the field-magnet coils, so that both contact-pieces $e^7$ and $e^{7\times}$ are connected with both this field-magnet terminal $F'$ and, through the terminal $h^5$, the battery-pole $+1$.

The contact pieces or brushes $c'\ c^2\ c^3\ c^4\ c^5\ c^6$ on the lower side of the switch-arm $b$ are six in number and of suitable length. The inner one $c'$ presses upon the contact-pieces $e^2$ and $e^{2\times}$ as the switch $b$ is turned. It is also in constant connection with the inner contact-ring $e'$ through the metal arm $b$. The brushes $c^2$ $c^3$ $c^4$ press upon the contact-pieces $e^2$ $e^{2\times}$, $e^3$ $e^{3\times}$, and $e^4$ $e^{4\times}$, respectively, as the switch is turned. They are in metallic connection with each other, but are insulated by insulating material $o$ from the switch-arm $b$ and the other brushes. The brushes $c^5$ and $c^6$ press upon the contact-pieces $e^5$ $e^{5\times}$ and $e^6$ $e^{6\times}$, respectively. They are in metallic connection with each other, but are also insulated from the switch-arm $b$ and the other brushes. In this way as the arm is moved to the different positions the brushes connect the different contact-pieces in the required way, as already described, the inner brush being always in metallic connection with the inner contact-piece $e'$ adjoining the central spindle $d$ of the arm $b$. The brushes $c$ may be solid or built up or laminated and fit into recesses in metal blocks $p$ $p$, insulated from, but attached to, the switch-arm $b$, and they are formed or provided with springs which press them into sufficiently good electrical contact with the several contact-pieces $e$ below them. As, however, "sparking" may occur on the contact-pieces when the brushes come in contact with or leave them, we prefer to entirely cut off electrical current through them except when the brushes are properly pressing upon the contact-pieces. This we do by means of a separate metal switch-arm which works in proper relation with that, $b$, already described, but which gradually completes the circuit (between $+1$ and $F'$) when the switch-brushes $c$ have reached their proper position upon the contact-pieces $e$ below and gradually breaks the circuit before the brushes have left the contact-pieces. For this purpose we arrange on the left-hand side of the apparatus, viewed from above, as described, a second switch, consisting of an arm $m$, turning upon (but insulated from) a center $n$ near one of its ends, which end $r$ is provided with a brush or contact-piece $s$ in metallic contact with a curved contact-plate $t$ below, which is connected with the terminal $F'$ of the field-magnet coil. (See Fig. 4.) The other or longer arm $u$ of this switch-arm $m$ is also provided with a brush or contact-piece $v$, which presses in succession upon a series of separate fixed contact-pieces $w'$ $w^2$ $w^3$ as the switch-arm $m$ is moved through about a quarter of a circle.

When the switch-arm described is in a central position, (pointing, that is to say, directly to the center $d$ of the main switch-arm first described,) the contact or brush $v$ upon its longer arm $u$ rests upon a central fixed contact-piece $x$, which is connected with a conducting-wire leading to and connected with the outer or seventh fixed contact-pieces $e^7$ (and $e^{7\times}$, to which it is connected) of the apparatus first described, (see Fig. 4,) which contact-pieces are therefore connected, through the second switch-arm $m$, (which forms an insulated conducting-bridge,) with the terminal $F'$ of the field-magnet coil.

Assuming that a series of, say, three separate fixed contact-pieces $w'$ $w^2$ $w^3$, as shown, are used, against which the brush $v$ upon the longer arm $u$ of the second switch presses in succession, as described, suitable "resistances" $y'$ $y^2$ $y^3$ of the well-known kinds are arranged between $w'$ and $w^2$, $w^2$ and $w^3$, and between $w^3$ and the central one $x$, which is connected with $F'$ of the field-magnet, as described. If, therefore, the second switch $m$ is in a position across the apparatus, with the brush on its longer arm resting upon the first $w'$ of the contact-pieces, the current through the bridge has to pass through the whole of the resistances $y'$ $y^2$ $y^3$ on its way to $x$, and as the switch $m$ is moved around its longer arm $u$ passes in succession over the other contact-pieces $w^2$ and $w^3$, the resistance being gradually reduced until in its final position the resistances have all been cut out and the current passes through $x$, directly through the bridge, and through the contact $t$ under the shorter arm. The current is therefore gradually (instead of suddenly) admitted to the circuit. A similar set of fixed contact-pieces $w'^\times$, $w^{2\times}$, and $w^{3\times}$ and resistances $y'^\times$, $y^{2\times}$, and $y^{3\times}$ (or the same resistances may be made use of) is arranged on the opposite side of the apparatus, so that if the movement of the switch-arm or bridge $m$ is continued through another quarter of a circle the current is gradually cut off from (instead of being gradually supplied to) the circuit. During the other half of the revolution of the switch or bridge over the part marked $z$, Fig. 1, (if it is turned through a complete circle,) its longer arm is free from any contact. It only remains, therefore, to make an arrangement by which during the time that the current is thus entirely cut off from the bridge $m$ the other switch-arm $b$ is adjusted into the proper position, (according to the requirements of full speed ahead, half-speed ahead, full speed astern, and half-speed astern,) and when this has been done the continued movement of the second switch or bridge $m$ then admits the current through the proper connections to obtain the required result. In the same way when a modified result is required the current is first gradually cut off, and the main switch is then moved into its new position and the current gradually readmitted through the newly-selected circuit. In order to effect this, we fix upon the spindle $d$, which carries the main switch, as shown in Figs. 2, 3, and 5, a disk 1 of considerable diameter, insulated from the spindle $d$ and having a series or radial slots or notches 2, 3, 4, and 5 in its circumference, and upon the spindle $n$, which carries the second switch or bridge $m$, we fix a second disk or arm 6, carrying a pin 7, which engages with one or other of the slots 2, 3, 4, or 5, and (as the bridge $m$ is turned around by a handle 8) at each complete revolution moves the larger disk 1 and main switch-arm $b$ through a sufficient space to change the connections from one position to the next. The pin 7 is so arranged that when it is acting upon one of the slots and turning the main switch-arm $b$ the current through the bridge $m$ is cut off, while after the pin 7 has left the slot the continued revolution of the handle 8 gradually admits the current through the bridge $m$ and the main switch-arm $b$ in the way already described. When further alteration is required, the handle 8 is again turned and the current is first gradually cut off, and the pin 7 then engages with one of the notches and brings the main switch $b$ into a fresh position, and after this is done the current is automatically readmitted.

Instead of the notched disk operated by a pin well-known equivalent devices may be made use of. For instance, a toothed wheel may be fixed upon the spindle of the main switch-arm, gearing with the pinion upon the spindle of the conducting-bridge. The pinion is provided with teeth upon only a part of its circumference, so that it only causes the revolution of the main switch-arm at the same time when the current has been cut off, the remainder of the revolution of the handle leaving the larger-toothed wheel stationary while the current is being gradually admitted or cut off.

A hand or pointer 9 is carried by the spindle $d$ of the main switch-arm $b$ and shows the exact position of the latter. By the use of suitable gear the necessary movements of the second switch or bridge may be produced without a complete revolution of the handle. For this purpose the arrangement illustrated in Figs. 5 and 6 may be used. The handle 8 is carried upon a third spindle 10, which has fixed upon it a toothed wheel 11, gearing with a smaller pinion 12 upon the spindle $n$ of the smaller switch. By this means the requisite number of revolutions of the wheel 6 and pin 7 to move the main switch through the required number of degrees of a circle can be effected by a single revolution of the handle 8 or by part of a revolution of the handle 8. A spring detent may be arranged, pressing against the notches in the disk or against other notches suitably arranged for the purpose, so that the position of the main switch-arm is prevented from being accidentally altered, but without preventing its revolution when required. This arrangement, which is not essential, is so obvious that it has not been illustrated.

We arrange a movable contact-plug in a suitable part of the conducting-wire circuit— for instance, at 13, Figs. 1 and 4—which can be readily removed when desired, so as to prevent any tampering with the apparatus.

The number of different effective positions of the main switch-arm may be increased to any desired extent, the necessary connections for the corresponding circuits of the current being arranged accordingly.

The insulated cases containing the spring-brushes can be readily removed when necessary to substitute fresh brushes.

Having fully described our invention, what we desire to claim and secure by Letters Patent is—

1. The combination, in a switch for altering the speed and direction of revolution of electric motors, of a spindle $d$ turning in bearings in the frame $a$, $g$, switch-arm $b$, carrying spring-brushes $c'$, $c^2$, $c^3$, $c^4$, $c^5$, $c^6$, insulated from the switch-arm $b$, concentric insulated contact-pieces $e'$, $e^2$, $e^3$, $e^4$, $e^5$, $e^6$, $e^7$, below the spring-brushes $c$, on one side of the central line $x\,y$, concentric insulated contact-pieces $e^{2\times}$, $e^{3\times}$, $e^{4\times}$, $e^{5\times}$, $e^{6\times}$, $e^{7\times}$, below the spring-brushes $c$, but on the other side of the central line $x\,y$, insulated conductors $k^2$, $k^3$, $k^4$, $k^5$, $k^6$, $k^7$, $k^8$, $k^9$, $k^{10}$, $k^{11}$, $k^{12}$, connecting the different concentric contact-pieces $e'\,e^7$, $e^{2\times}\,e^{7\times}$, and conducting-wires and terminals $h$, $h'$, $h^2$, $h^3$, $h^4$, and $h^6$, with the poles $+1$, $-1$, $+2$ and $-2$ of the two halves of the batteries $B'$, $B^2$, with the coils of the field-magnets at $F'$, $F^2$, and with the commutator-brushes $A'$, $A^2$, substantially as described.

2. The combination with the spindle $d$, switch-arm $b$, insulated spring-brushes $c'\,c^6$, concentric insulated contact-pieces $e'\,e^7$, and $e^{2\times}\,e^{7\times}$, insulated conductors $k^2\,k^{12}$, and conducting-wires and terminals $h\,h^6$, of the handle 8 on second spindle $n$ carrying insulated bridge $m$, spring-brushes $s$ and $v$, insulated concentric contact-pieces $t$, $w'$, $w^2$, $w^3$, $x$, $w'^{\times}$, $w^{2\times}$, $w^{3\times}$, resistances $y'$, $y^2$, $y^3$, $y'^{\times}$, $y^{2\times}$, $y^{3\times}$, conductor $l$ between the contact-pieces $x$ and $e^{7\times}$, and conductor from the contact-piece $t$ to the terminal $h^5$ and terminal $F'$ of the field-magnet coil, substantially as described.

In testimony whereof we have hereunto affixed our signatures in presence of two witnesses.

WILLIAM ROWLAND EDWARDS.
SEPTIMUS FELIX BEEVOR.

Witnesses:
ARTHUR ERNEST EDWARDS,
WALTER ERNEST SYKES.